United States Patent [19]

Yoshii

[11] 4,443,157

[45] Apr. 17, 1984

[54] CONTROL CIRCUIT FOR A LIQUID FUEL COMBUSTION APPARATUS

[75] Inventor: Hisao Yoshii, Sanjo, Japan

[73] Assignee: Dainichi Kogyo Co., Ltd., Shirone, Japan

[21] Appl. No.: 256,912

[22] Filed: Apr. 23, 1981

[30] Foreign Application Priority Data

Apr. 28, 1980 [JP] Japan .............................. 55-58979[U]

[51] Int. Cl.³ ........................ F04B 49/06; G05B 11/18
[52] U.S. Cl. ................................... 417/45; 236/74 A; 236/78 D; 318/59 G
[58] Field of Search ................ 236/78 D, 74 A, 46 F, 236/1 A; 318/59 G; 219/505, 499; 165/2 G; 417/45

[56] References Cited

U.S. PATENT DOCUMENTS

| | | | |
|---|---|---|---|
| 3,149,293 | 9/1964 | Farkas | 236/46 F |
| 3,419,775 | 12/1968 | Kardos | 318/59 G |
| 3,665,500 | 5/1972 | Lewis et al. | 318/59 G |
| 3,733,463 | 5/1973 | Low et al. | 219/499 |

FOREIGN PATENT DOCUMENTS 874099 6/1971 Canada .
49-8176 7/1974 Japan .
52-5003 9/1977 Japan .
55-5471 9/1980 Japan .

OTHER PUBLICATIONS

A Gasified Kerosene Burner which was published by the Mitsubishi Electric Corp., in May, 1979.
A Gasified Kerosene Burner which was published by the General Corporation, in Oct. of 1977.

Primary Examiner—William E. Wayner
Attorney, Agent, or Firm—Joseph R. Slotnik

[57] ABSTRACT

A control circuit for a liquid fuel combustion apparatus which employs a differential amplifier and square-wave generator to maintain a strong constant combustion in the burner until the differential amplifier senses that room temperature has approached a preselected target temperature, at which point the differential amplifier operates to alter the square-wave generator output to gradually reduce the combustion rate in an inverse proportion to room temperature as the target temperature is being reached. The differential amplifier subsequentially controls the square-wave generator in a manner which causes fuel to be available at a rate necessary and sufficient for maintaining the target temperature.

9 Claims, 3 Drawing Figures

U.S. Patent    Apr. 17, 1984    4,443,157
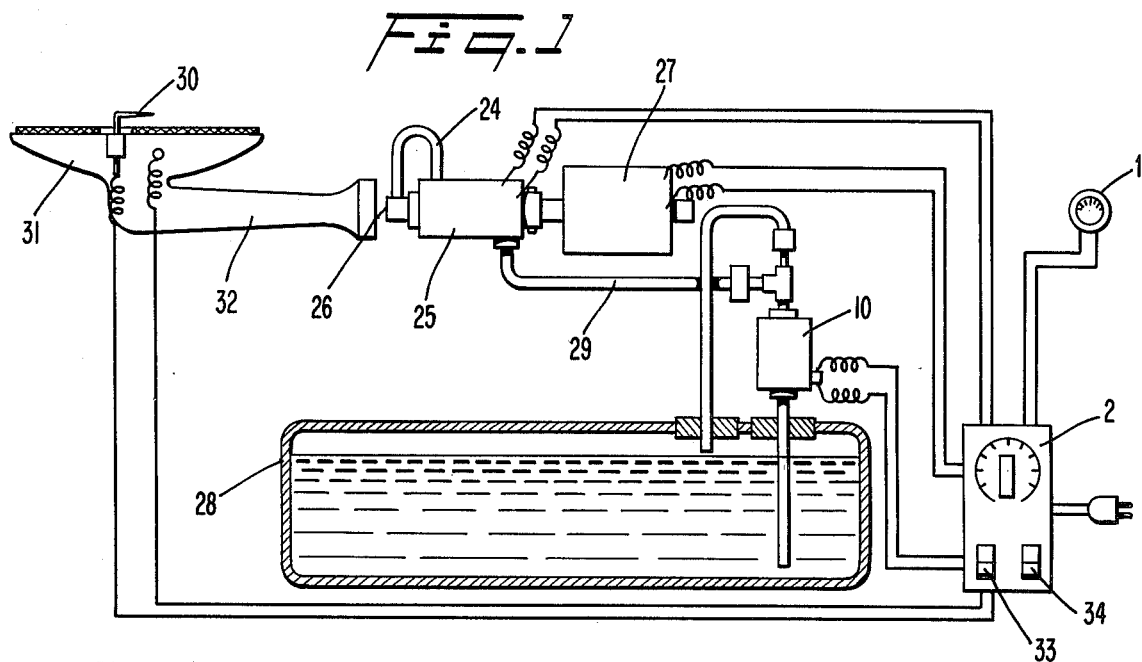
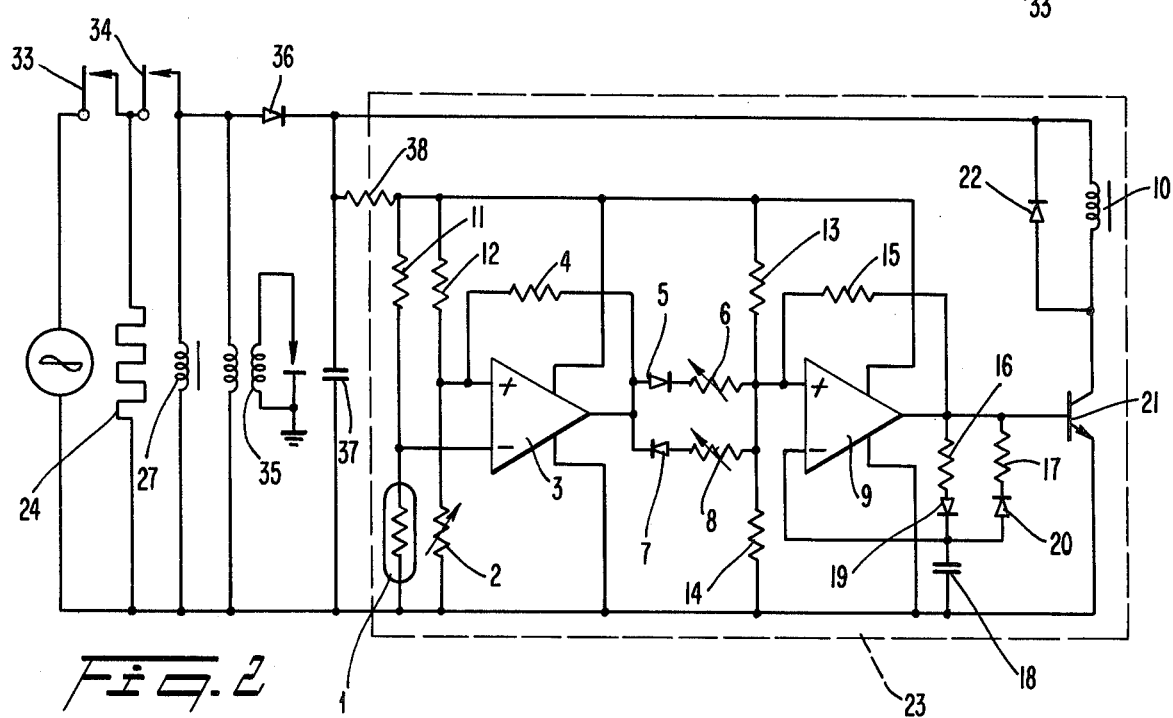
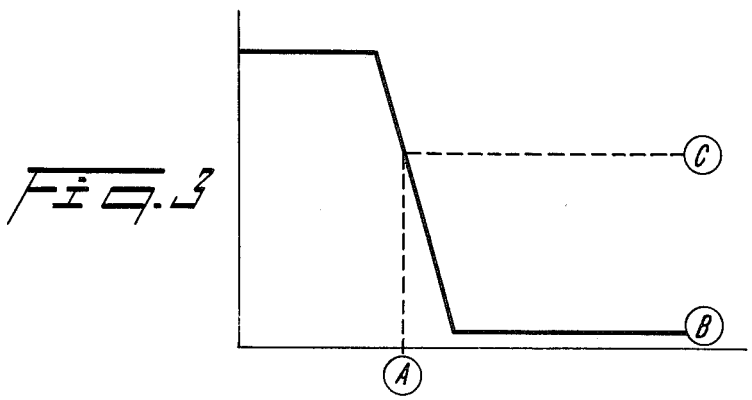

CONTROL CIRCUIT FOR A LIQUID FUEL COMBUSTION APPARATUS

BACKGROUND OF THE INVENTION

The present invention relates to a control circuit for a liquid fuel combustion apparatus utilizing an electromagnetic pump for fuel feeding, wherein a thermo-sensitive element detects room temperature to control fuel feeding to a burner thereby automatically maintaining a desired room temperature, thus economizing fuel and preventing air pollution in the room resulting from incomplete combustion.

Automatic room temperature control in conventional kerosene combustion apparatus has been conducted by (1) repeated ignition and extinguishing of the burner or (2) repeated strong and weak combustion.

In the above-mentioned method (1), the combustion is continued at a pre-determined rate until a preselected room temperature is reached. The burner is extinguished when the room temperature exceeds the preselected value. Combustion is started again as the room temperature becomes lower than said predetermined value. Consequently, the burning period of the burner becomes longer as the difference between the room temperature and the preselected temperature is larger or as the room area is larger, and vice versa.

This method is defective in that the burner tends to generate soot or unburnt gas due to unstable combustion soon after burner ignition. This method also tends to release unburnt gas after the burner is extinguished. Furthermore, repeated combustion and extinguishing causes significant temperature fluctuation in the vicinity of the burner, causing discomfort to the user.

The above-mentioned method (2) is associated with discomfort resulting from temperature fluctuation, although the formation of soot or unburnt gas can be prevented in this case.

In addition, the repeated ignition and extinguishing or repeated switching between strong and weak combustion in the methods (1) or (2) leads to an accelerated wear of the equipment, reducing the service life thereof.

Accordingly, it is an object of the present invention to provide a control circuit for a combustion apparatus which comfortably regulates room temperature.

Another object of the present invention is to provide a control circuit for a combustion apparatus which comfortably regulates room temperature without generation of soot or unburnt gas.

A still further object of the present invention is to provide a control circuit for a combustion apparatus which comfortably regulates room temperature without requiring a relatively long period for reaching a target temperature.

SUMMARY OF THE INVENTION

To achieve the foregoing objects and in accordance with the purposes of the present invention, as embodied and described herein, there is provided a liquid fuel combustion control capable of (i) maintaining a strong combustion in the burner until the room temperature approaches the preselected target temperature for minimizing the time required for reaching said target temperature, (ii) gradually reducing the combustion rate by the proportional control method from a room temperature slightly lower than said target temperature, and (iii) feeding the fuel at a rate necessary and sufficient for maintaining the target temperature after it is reached, thereby preventing the formation of unburnt gas and discomfort resulting from temperature fluctuation.

The control circuit preferably comprises a circuit means, including a thermo-sensitive element and a variable resistor, for providing a first signal which represents the difference between the temperature sensed by the thermo-sensitive element and a temperature represented by the setting of the variable resistor; means for converting the first signal into a second signal, the second signal having a first constant level when the temperature sensed is a predetermined amount less than the temperature represented by the setting of said variable resistor, a second different constant level when the temperature sensed is a predetermined amount greater than the temperature repesented by the setting of said variable resistor, and the second signal being proportional to the first signal therebetween; a signal generator; means of rendering the operation of the signal generator responsive to the output of the means for converting; and means for controlling a fuel pump in response to the signal generator.

Preferably, the circuit means comprises a resistance bridge including a plurality of resistors; the means for converting comprising an amplifier circuit; the signal generator comprises a square wave generator; and the means for rendering comprises the parallel combination of a first rectifier series connected with a first resistor and a second rectifier series connected to a second resistor, the first and second rectifiers being of opposite polarity orientation.

In other words, the present invention relates to a control circuit for fuel combustion apparatus which utilizes a fuel pump for feeding a liquid fuel, comprising: a resistance bridge circuit including a thermo-sensitive element whose value represents ambient temperature and a variable resistor whose setting represents a predetermined temperature; an amplifier circuit means for generating a signal which is a first constant value when the ambient temperature is below the predetermined temperature, proportional to the output of the bridge circuit when the ambient temperature approximates the predetermined temperature, and a second constant value when the ambient temperature is above the predetermined temperature; a square wave generator; a parallel circuit composed of a series connection of a forward rectifier and a first resistor and of another series connection of an inverse rectifier and a second resistor, the parallel circuit being connected between the amplifier circuit means and the square wave generator to render the operation of the square wave generator responsive to the output of the amplifier circuit means; and means for controlling the fuel pump in response to the square wave voltage output from the square wave generator.

It is also preferable that the circuit include a power supply source for the square wave generator; a plurality of serially connected resistors couple parallel to the power supply for the square wave generator, with the input of the square wave generator coupled to an intermediate junction point of the plurality of serially connected resistors. At least one of the first and second resistors of said parallel circuit is preferably a variable resistor; and the circuit preferably includes a fuel pump which is electromagnetically operated.

BRIEF DESCRIPTION OF THE DRAWINGS

The accompanying drawings which are incorporated in and constitute part of this specification, illustrate embodiments of this invention and, together with description, serve to explain the principle of the invention.

FIG. 1 is a view of a liquid fuel combustion apparatus.

FIG. 2 is a diagram of the control circuit suitable for use with the apparatus of FIG. 1.

FIG. 3 is a graph showing an operation characteristic of the control circuit of FIG. 2.

DETAILED DESCRIPTION OF THE PREFERRED EMBODIMENT

In FIGS. 1 and 2 there are shown a thermo-sensitive resistor 1 and a temperature-setting variable resistor 2. The output voltage of a resistance bridge circuit comprising thermo-sensitive resistor element 1 and a temperature-setting variable resistor 2 is supplied to a differential amplifier 3 which may be constructed in the form of an integrated circuit. A feedback resistor 4 is connected to differential amplifier 3 for forming an output characteristic for differential amplifier 3 having two plateau areas and a proportional area. Differential amplifier 3 provides an output voltage through a forward rectifier 5 and a variable resistor 6 and also through an inverse rectifier 7 and a variable resistor 8 to the positive input terminal of a differential amplifier 9 which may also be constructed in the form of an integrated circuit. Differential amplifier 9 forms a variable-width square wave generator which is used to control an electromagnetic pump 10 for feeding fuel to the liquid fuel combustion apparatus of FIG. 1.

In FIG. 2 there are also shown resistors 11 and 12 constituting the resistance bridge with resistor 11 coupled in series with thermo-sensitive element 1, resistor 12 coupled in series with variable resistor 2, the junction of resistor 11 and element 1 coupled to the negative input of differential amplifier 3, and the junction of resistors 12 and 3 coupled to the positive input of differential amplifier 3. Resistors 13 and 14 are series connected in parallel with the power supply for differential amplifier 9 and the resulting square wave generator for determining a reference voltage. The input of the square wave generator is coupled to an intermediate junction point of resistors 13 and 14, and a positive feedback resistor 15 is coupled between the output and positive input terminal of differential amplifier 9.

A charging time-constant determining resistor 16 for determining the high-level period of the square wave, and a discharging time-constant determining resistor 17 for determining the low-level period of said square wave are coupled to the output of differential amplifier 9. A charging-discharging time-constant capacitor 18 and rectifier 19 are series connected between resistor 16 and a negative power bus. Rectifier 20 is coupled between resistor 17 and capacitor 18, in opposite polarity orientation to rectifier 19. A power transistor 21 for driving an electromagnetic pump 10, and an inverse voltage absorbing rectifier 22 are coupled to the output of differential amplifier 9.

These elements constitute an automatic combustion control unit 23, of which the function will be explained in the following. When the input voltage supplied from the resistance bridge to differential amplifier 3 is large and forward biased to the positive input terminal thereof, the output voltage thereof assumes a constant high level which is substantially equal to the positive potential of the power supply. When said input voltage is large but reversed biased, the output voltage of the differential amplifier 3 assumes a constant low level which is substantially equal to the negative potential of the power supply. Also in case said input voltage is in the vicinity of zero potential, namely between first and second predetermined values, the output voltage assumes a value proportional to said input voltage between said high and low levels. The range of change in input voltage corresponding to the change in output voltage from said high level to said low level becomes smaller, more sensitive as the resistance of the feedback resistor 4 becomes higher, and vice versa.

The resistance bridge involving the thermo-sensitive element 1 provides a positive, zero or negative output voltage according to the change in the circumferential temperature around the target temperature. Consequently in the vicinity of the target temperature, the output voltage of differential amplifier 3 assumes an intermediate value in the aforementioned proportional area between said high and low levels as shown in FIG. 3. As represented therein, the output voltage of the integrated circuit 3 in the ordinate changes according to a curve B around a voltage C corresponding to the target temperature A, as a function of the room temperature in the abscissa.

The output voltage from differential amplifier 3 is supplied to the positive input terminal of the differential amplifier 9 through the parallel combination of a serial circuit of the rectifier 5 and the variable resistor 6 and another serial circuit of the rectifier 7 and the variable resistor 8. The input voltage to said positive input terminal of the differential amplifier 9 assumes a high level determined by dividing the power supply voltage between the resistor 14 and a parallel connection of variable resistor 6, resistor 13 and oscillation feedback resistor 15 when the output voltage of the differential amplifier 3 is at the high plateau level. The input voltage assumes a low level determined by dividing the power supply voltage between a parallel connection of variable resistor 8 and resistor 14 and a parallel connection of resistor 13 and oscillation feedback resistor 15 when the output voltage of differential amplifier 3 is at the low plateau. Also when the output voltage of differential amplifier 3 is located within the proportional range, the input voltage to differential amplifier 9 assumes a proportional value between said high and low levels. In this manner the input voltage to the positive input terminal of differential amplifier 9 varies in such a manner as to have two plateau areas and a proportionally changing area according to the output voltage of differential amplifier 3, wherein the high-level plateau and the low-level plateau can be independently determined by the variable resistors 6 and 8, respectively.

The variable-width square wave generator involving differential amplifier 9 functions in the following manner. When the output voltage of differential amplifier 9 reaches the high level, capacitor 18 is charged through charging resistor 16 and rectifier 19, whereby the voltage of the negative input terminal of the differential amplifier 9 starts to increase. When said voltage reaches that of the positive input terminal, differential amplifier 9 releases a low level output voltage, whereby the voltage of the positive input terminal thereof is inverted to a value lower than that of the negative input terminal since said positive input terminal is connected through the feedback resistor 15 to the output terminal which has assumed the low level output voltage. From this moment capacitor 18 is discharged through rectifier 20 and discharging resistor 17, thus reducing the voltage of the negative input terminal, the inversion takes place again to return the output terminal voltage to he original high-level state. The square wave oscillation is continued in this manner.

In said square wave generator, the pulse width of the obtained square wave is variable according to the magnitude of the voltage applied to the positive input terminal of the differential amplifier 9, and becomes larger as the output voltage from differential amplifier 3 increases, and vice versa.

In response to the output pulses from said generator, power transistor 21 provides a pulse-shaped output current which is utilized for driving electromagnetic pump 10 after smoothing in rectifier 22.

Such increased pulse width from the square wave generator increases the effective current to the electromagnetic pump, thereby increasing the fuel feeding to the burner.

An embodiment of the liquid fuel combustion apparatus is shown in FIG. 1, wherein a gasifier 25 having an electric heater 24 is provided with a nozzle 26 and a solenoid valve 27 for opening or closing said nozzle. Gasifier 25 is connected to a fuel tank 28 through a fuel pipe 29 and electromagnetic pump 10. A mixing pipe 32 of a burner 31 having an ignition plug 30 is positioned in facing relation to said nozzle 26. The thermo-sensitive resister element 1 is installed in a place desired for temperature control and is connected to the electric circuit shown in FIG. 2. As shown in FIG. 2 a power switch 33, an ignition switch 34, an ignition transformer 35, a rectifier 36, a smoothing condenser 37 and a voltage-dropping resistor 38 are coupled between a source of A.C. power and combustion control unit 23.

The above-explained apparatus functions in the following manner. At first power switch 33 is closed to effect sufficient preliminary heating of gasifier 25 by means of electric heater 24. Ignition switch 34 is then closed to activate solenoid valve 27, ignition transformer 35 and automatic combustion control unit 23 through rectifier 36, whereby the solenoid valve 27 is opened and ignition plug 30 initiates discharge. Thus the liquid fuel is supplied under pressure by pump 10 from fuel tank 28 through fuel pipe 29 to gasifier 25, and gasified fuel is ejected from the nozzle into mixing pipe 32 and ignited in burner 31.

As explained in the foregoing, the combustion apparatus of the present invention is capable of reducing temperature fluctuation to avoid discomfort and to provide economical heating without loss in fuel feeding. Automatic combustion control unit 23 maintains a strong combustion in the initial period when room temperature is lower than the target temperature to minimize the period required for reaching said target temperature. Automatic combustion control unit 23 then gradually reduces the rate of combustion by a proportional control from a room temperature slightly lower than said target temperature, and supplies the fuel in an amount necessary and sufficient for maintaining said target temperature after it is reached. When room temperature is high over said target temperature fuel supply is maintained at minimum rate enough to keep complete combustion. Furthermore the liquid fuel combustion apparatus of the invention, being free from repeated ignition and extinguishing of the burner as in the conventional apparatus, avoids the formation of soot or unburnt gas resulting from incomplete combustion, thus preventing air pollution and ensuring prolonged service life of the apparatus.

It will be apparent to those skilled in the art that various additions, substitutions, modifications an omissions can be made to the device of the present invention without departing from the scope or spirit of the invention. Thus, it is intended that the present invention cover the additions, substitutions, modifications, and omissions of this invention provided they come within the scope of the appended claims and their equivalents.

I claim:

1. A control circuit for a liquid fuel combustion apparatus which utilizes a fuel pump for feeding a liquid fuel, comprising:
   (a) circuit means including a thermo-sensitive element and a variable resistor for providing a first signal which represents the difference between the temperature sensed by said thermo-sensitive element and a temperature represented by the setting of said variable resistor;
   (b) means for converting said first signal to a second signal, said second signal having a first constant level when said temperatures sensed is a predetermined amount less than said temperature represented by the setting of said variable resistor, a second different constant level when said temperature sensed is a predetermined amount greater than said temperature represented by the setting of said variable resistor, and said second signal being proportional to said first signal therebetween;
   (c) a signal generator;
   (d) means for rendering the operation of said signal generator responsive to the output of said means for converting; and
   (e) means for controlling said fuel pump in response to said signal generator, said controlling means being operable to cause said fuel pump to deliver fuel for supporting strong combustion in said combustion apparatus in response to levels of said second signal below said first constant level, and operable to cause said fuel pump to gradually reduce the fuel delivery rate in response to levels of said second signal between said first and second constant levels, the fuel delivered by said fuel pump at said second signal second constant level being sufficient to maintain complete combustion in said combustion apparatus.

2. The control circuit of claim 1 wherein said circuit means comprises a resistance bridge including a plurality of resistors.

3. The control circuit of claim 1 wherein said means for converting comprising an amplifier circuit.

4. A control circuit for a fuel combustion apparatus which utilizes a fuel pump for feeding a liquid fuel, comprising:
   (a) a resistance bridge circuit including a thermo-sensitive element whose value represents ambient temperature and a variable resistor whose setting represents a predetermined temperature;
   (b) an amplifier circuit means for generating a signal which is a first constant value when the ambient temperature is below said predetermined temperature, proportional to the output of said bridge circuit when the ambient temperature approximates said predetermined temperature, and a second constant value when the ambient temperature is above said predetermined temperature;
   (c) a square-wave generator;
   (d) a parallel circuit composed of a series connection of a forward rectifier and a first resistor and of another series connection of an inverse rectifier and a second resistor, said parallel circuit being connected between said amplifier circuit means and said square wave generator to render the operation of said square wave generator responsive to the output of said amplifier circuit means; and (e) means for controlling said fuel pump in response to the square wave voltage output from said square wave generator.

5. A control circuit according to claim 4 further including a power supply source for said square wave generator; a plurality of serially connected resistors coupled in parallel to said power supply for said square wave generator; and wherein the input of said square wave generator is coupled to an intermediate junction point of said plurality of serially connected resistors.

6. A control circuit according to claim 4 wherein at least one of said first and second resistors of said parallel circuit is a variable resistor.

7. The control circuit according to claim 1 further including a fuel pump which is electromagnetically operated.

8. A control circuit for a liquid fuel combustion apparatus which utilizes a fuel pump for feeding a liquid fuel, comprising:

(a) circuit means including a thermo-sensitive element and a variable resistor for providing a first signal which represents the difference between the temperature sensed by said thermo-sensitive element and a temperature represented by the setting of said variable resistor;

(b) means for converting said first signal into a second signal, said second signal having a first constant level when said temperature sensed is a predetermined amount less than said temperature represented by the setting of said variable resistor, a second different constant level when said temperature sensed is a predetermined amount greater than said temperature represented by the setting of said variable resistor, and said second signal being proportional to said first signal therebetween;

(c) a signal generator comprising a square wave generator;

(d) means for rendering the operation of said square wave generator responsive to the output of said means for converting; and (e) means for controlling said fuel pump in response to said square wave generator.

9. A control circuit for a liquid fuel combustion apparatus which utilizes a fuel pump for feeding a liquid fuel, comprising:

(a) circuit means including a thermo-sensitive element and a variable resistor for providing a first signal which represents the difference between the temperature sensed by said thermo-sensitive element and a temperature represented by the setting of said variable resistor;

(b) means for converting said first signal into a second signal, said second signal having a first constant level when said temperature sensed is a predetermined amount less than said temperature represented by the setting of said variable resistor, a second different constant level when said temperature sensed is a predetermined amount greater than said temperature represented by the setting of said variable resistor, and said second signal being proportional to said first signal therebetween;

(c) a signal generator;

(d) means for rendering the operation of said signal generator responsive to the output of said means for converting, said means for rendering comprising a parallel combination of a first rectifier series connected with a first resistor and a second rectifier series connected to a second resistor, said first and second series connected rectifiers being of opposite polarity orientation; and (e) means for controlling said fuel pump in response to said signal generator.

* * * * *